(12) United States Patent
Hancock et al.

(10) Patent No.: US 11,524,495 B2
(45) Date of Patent: Dec. 13, 2022

(54) CLOSED LOOP FEEDBACK PRESS

(71) Applicant: NIKE, Inc., Beaverton, OR (US)

(72) Inventors: Stephen Hancock, Wake Forest, NC (US); Nicolai Luksza, Austin, TX (US); Adam Montoya, Shepherdsville, KY (US); Charles W. Morrison, Jarrell, TX (US); Daniel Black Thayer, Plano, TX (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/820,990

(22) Filed: Mar. 17, 2020

(65) Prior Publication Data

US 2020/0298548 A1 Sep. 24, 2020

Related U.S. Application Data

(60) Provisional application No. 62/821,271, filed on Mar. 20, 2019.

(51) Int. Cl.
*B32B 41/00* (2006.01)
*B32B 38/00* (2006.01)
(Continued)

(52) U.S. Cl.
CPC ............... *B32B 41/00* (2013.01); *B32B 7/12* (2013.01); *B32B 37/12* (2013.01);
(Continued)

(58) Field of Classification Search
CPC .............. B29C 66/91423; B29C 66/81; B29C 66/8122; B29C 66/81264; B32B 2309/125
See application file for complete search history.

(56) References Cited

U.S. PATENT DOCUMENTS

2008/0250668 A1 10/2008 Marvin et al.
2012/0052311 A1* 3/2012 Bennett ............... B29C 65/8246
428/446
(Continued)

FOREIGN PATENT DOCUMENTS

CN 201613576 U 10/2010
CN 205197188 U 5/2016
(Continued)

OTHER PUBLICATIONS

International Search Report and Written Opinion received for PCT Patent Application No. PCT/US2020/023424, dated Jul. 24, 2020, 13 pages.

(Continued)

*Primary Examiner* — Carson Gross
(74) *Attorney, Agent, or Firm* — Shook, Hardy & Bacon L.L.P.

(57) ABSTRACT

The pressing of an article is achieved with a closed-loop feedback press. The closed-loop feedback press is effective to measure an amount of pressure applied and adjust the pressure to achieve a prescribed amount of compression on the article. Further, the press may leverage a closed-loop feedback system to maintain a consistent temperature of one or more platens. The press is able to adjust a pressure applied one or more times during a pressing operation to accelerate a temperature change in the pressed article while reducing the pressure applied as the temperature approaches a target temperature to limit unintentional deformation and bleeding of the pressed material of the article.

16 Claims, 7 Drawing Sheets

(51) Int. Cl.
  *B32B 37/12*  (2006.01)
  *B32B 7/12*  (2006.01)
  *B29C 65/00*  (2006.01)

(52) U.S. Cl.
  CPC .... *B32B 38/0012* (2013.01); *B29C 66/91423* (2013.01); *B29C 66/92445* (2013.01)

(56) References Cited

U.S. PATENT DOCUMENTS

| | | |
|---|---|---|
| 2012/0247664 A1 | 10/2012 | Kobayashi |
| 2014/0150979 A1 | 6/2014 | Ko |
| 2015/0047779 A1 | 2/2015 | Mizuno et al. |
| 2017/0245582 A1 | 8/2017 | Green et al. |
| 2018/0361730 A1* | 12/2018 | Robinson ............ B41F 16/0046 |

FOREIGN PATENT DOCUMENTS

| | | |
|---|---|---|
| CN | 107852842 A | 3/2018 |
| JP | 2008307886 A | 12/2008 |
| JP | 5017158 B2 | 6/2012 |
| WO | 2014036124 A1 | 3/2014 |

OTHER PUBLICATIONS

International Preliminary Report on Patentability received for PCT Patent Application No. PCT/US2020/023424, dated Sep. 30, 2021, 9 pages.

* cited by examiner

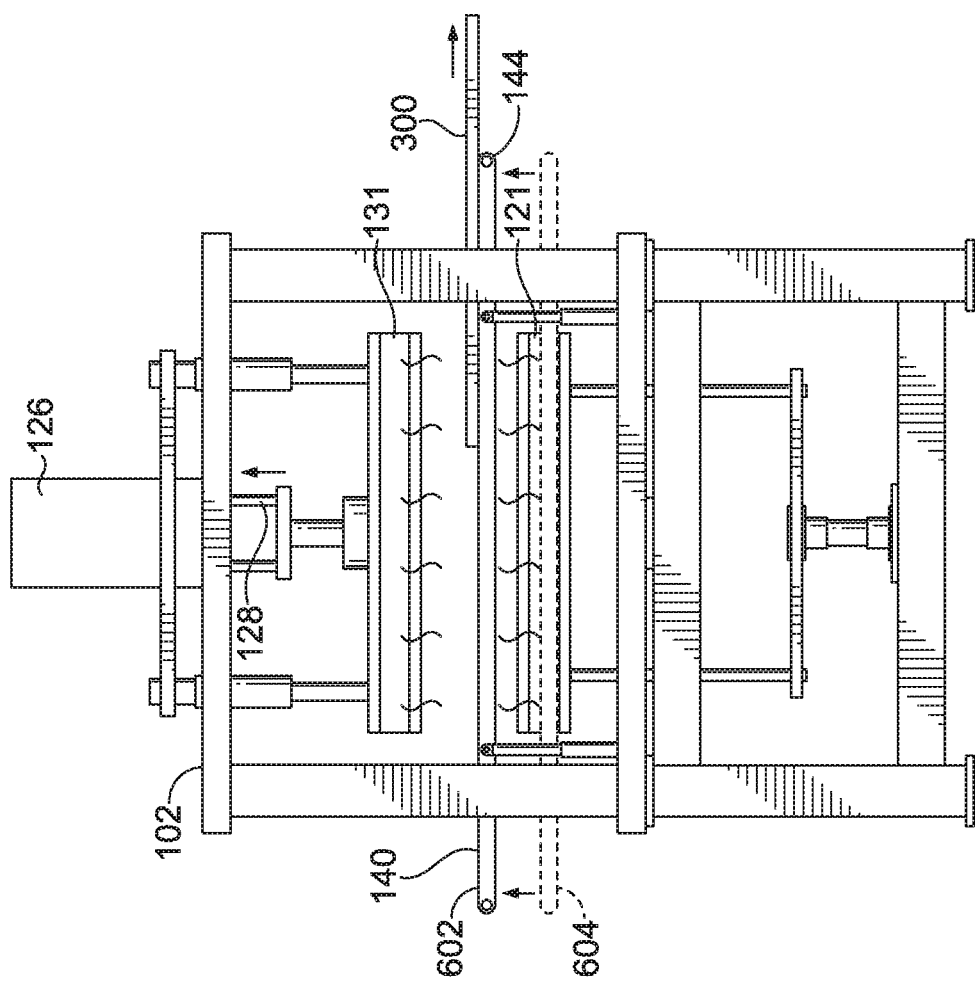

CLOSED LOOP FEEDBACK PRESS

CROSS-REFERENCE TO RELATED APPLICATIONS

This application claims the benefit of priority to U.S. Provisional Application No. 62/821,271, entitled "Closed Loop Feedback Press," and filed on Mar. 20, 2019. The entirety of which is incorporated by reference herein.

TECHNICAL FIELD

Aspects hereof relate to a system and method for pressing a stack of material in a closed loop feedback press.

BACKGROUND

A press compresses two or more materials to join the materials. Heat may optionally be applied to further aid in the bonding of the materials during the pressing operation. The bond between materials may be formed with an adhesive that responds to the pressure and/or thermal energy from the press.

BRIEF SUMMARY

Aspects hereof provide a method for pressing an article formed from two or more materials in a closed loop feedback press. The method includes compressing the article between a top platen having a top platen contacting surface and a bottom platen having a bottom platen contacting surface. The article is compressed at a first force and such that a temperature of the top platen contacting surface is less than a temperature of the bottom platen contacting surface. The method also includes maintaining the article in compression at the first force between the top platen and the bottom platen for a first time period. The first force is measured a plurality of times during the first time period and at least one of the top platen or the bottom platen are positionally adjusted to maintain the first force. The method also includes reducing the compression of the article between the top platen and the bottom platen to a second pressure after the first time period and then maintaining the article in compression at the second pressure between the top platen and the bottom platen for a second time period. The second pressure is measured during the second time period and at least one of the top platen or the bottom platen are positionally adjusted to maintain the second pressure.

Aspects herein also contemplate a press comprising a frame and a top platen positionally adjustable to the frame by an actuator. The top platen has a top platen contacting surface formed from a first material. The press also includes a top platen heating element that is associated with the top platen. The press further includes a load cell that is coupled with at least one of the actuator, the top platen, or the frame such that the load cell is effective to measure a force applied by the actuator through the top platen. The press also includes a bottom platen maintained by the frame such that the bottom platen has a bottom platen contacting surface formed from a second material. The press also includes a controller having a processor and memory that are effective to adjust an amount of force applied by the actuator through the top platen based on the load cell.

This summary is provided to enlighten and not limit the scope of methods and systems provided hereafter in complete detail.

DESCRIPTION OF THE DRAWINGS

The present invention is described in detail herein with reference to the attached drawing figures, wherein:

FIG. 8 depicts the press of FIG. 6 in a third configuration, in accordance with aspects hereof;

DETAILED DESCRIPTION

Figure 1:
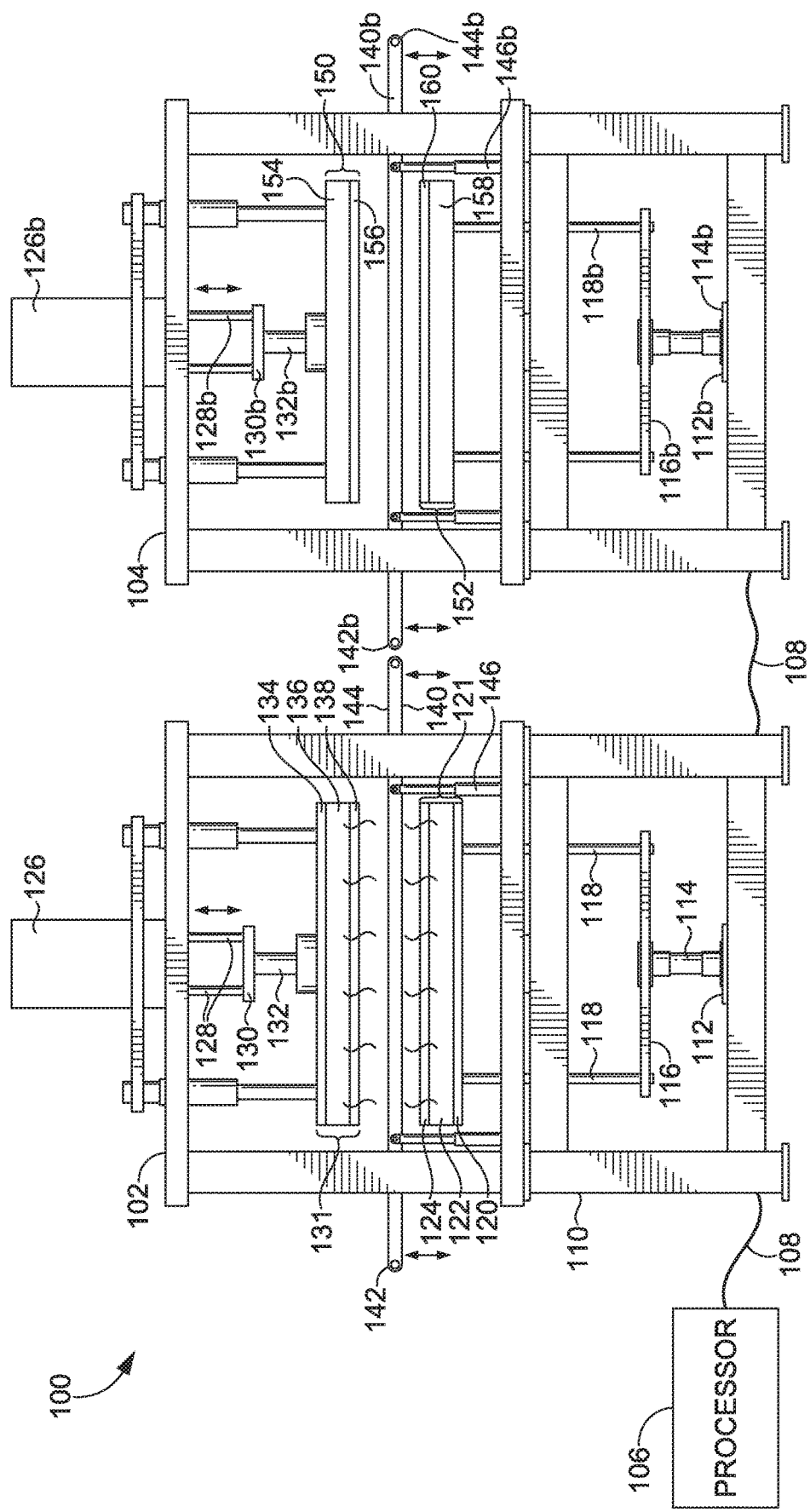
FIG. 1 depicts an example of a system for pressing an article with a closed loop feedback system, in accordance with exemplary aspects hereof.

Aspects hereof provide apparatuses, systems and/or methods to press an article in a press using a closed loop feedback system. Specifically, to reduce a pressing time used to bond a materials forming an article, the press determines an amount of pressure being applied to the materials and adjusts a position of one or both platens of the press to maintain a constant pressure. The press is a closed loop feedback press because it measures the force applied and adjusts a position of one or both platens in response to the measured force. This constant measure of force and adjustment of platen position is beneficial when a state-changing material is included in the collection of materials being pressed. For example, a thermal-melt adhesive (e.g., hot-melt, low-melt polymer adhesive) may be a film-like state at ambient conditions, but under pressure and/or thermal energy from the press may change states to a liquid-like state or deformed solid state. As the state changes of the state-changing material while under pressure, an amount of pressure experienced by the materials may reduce, which prevents the press from providing a constant pressure over time. A closed feedback loop measuring the pressure and adjusting a position of one or both platens as the state-changing material changes states is beneficial to maintain constant pressure, as will be discussed herein.

In a manufacturing environment, a cycle time is an amount of time required to complete a process cycle. In the context of a press for bonding materials, the cycle time includes a material transport time into the press, a pressing time, and a transport out of the press time. The pressing time may be broken down into additional increments, such as a press time at a first pressure, a press time at a second pressure, and the like. When a thermally-responsive material, such as a thermal-melt adhesive is included in the materials to be pressed, the press time may be influenced, at least in part, by an amount of time to transfer thermal energy to the thermally-responsive material such that the thermally-responsive material achieves at least a target temperature (e.g., 115-135 degrees C.), such as a deformation temperature or a melt temperature, for a sufficient period of time (e.g., 2-20 seconds). The press time may also be influenced by an amount of time it takes for the thermally-responsive material to reduce in temperature below the target (or any specified) temperature. This cooling period allows the thermally-responsive material form a sufficient tack or bond with the other pressed material(s).

To influence the press time in a cycle, a pressure variable may be adjusted, an order of operations may be adjusted, and/or a thermal energy variable may be adjusted. Aspects herein contemplate adjusting all of the above in different combinations with one or more omitted in some aspects. In a specific example, the thermal energy producing portion of a press (e.g., heating element) is maintained constant as there is thermal mass and the press elements may be relatively slow to adjust a temperature of a press portion relative to an amount of time that pressure can be adjusted. Therefore, the amount of pressure exerted on the materials is adjusted in this example. A greater amount of pressure is applied initially to enhance thermal conductivity through the materials, but as the materials increase in temperature, the amount of pressure applied is reduced to prevent deforming or otherwise damaging the materials being pressed. This varied pressure is effective, in this example, to reduce the press time of the cycle time through efficient conduction of thermal energy by increased pressure and reducing pressure as the material approaches a target temperature to prevent deforming or damaging the material at the elevated temperatures.

In addition (or alternatively) to reducing a cycle time during manufacturing, it is desired to reduce defects caused by the pressing operation. Defects may be formed in a pressing operation through an unintentional deformation or deterioration of the material(s) being pressed. Defects may alternatively be formed when a thermally-responsive material, such as an adhesive, is pressed such that it is exposed on one or more materials in an unintended location. For example, a thermal-melt adhesive may be sandwiched between two materials to be bonded. During the pressing of the three materials, the adhesive may melt and bleed beyond a perimeter of one or more of the to-be-bonded materials to an exposed surface. This exposure of the thermal-melt adhesive may form an aesthetic defect causing the article to be rejected. As such, prevention of this unintended bleeding is a goal in some aspects.

Prevention of bleeding of adhesive is accomplished, in an example, through varied pressure application at different portions of a press time. For example, while an adhesive is in a stable geometric shape (e.g., in a film-like state before approaching a target temperature) a greater amount of pressure is applied as the adhesive will not bleed while in the stable geometric state. However, as the adhesive approaches a target temperature and may begin transitioning to a less stable geometric state (e.g., flowing characteristic), the pressure is reduced to lessen the potential bleeding effect of the adhesive outside of the intended coverage area on the one or more materials. Therefore, the closed loop feedback press that adjusts a position of one or both platens in response to a detected pressure (e.g., force) applied to the materials is effective to reduce defects through a reduction in material bleeding.

To further reduce defects, aspects herein contemplate a conforming surface on one or both platens. As will be discussed in FIG. 4, a transition between thicknesses of a material stack may result in an uneven distribution of pressure with a rigid platen surface. As such, a higher concentration of force and therefore a greater pressure may be applied to a raised (e.g., thicker) portion of the material stack when using a non-conforming surface on the platens. This lack of conformance may cause bleeding (e.g., flowing of material outside of an intended location) of material from the raised portion experiencing a higher pressure than intended. To combat an unequal distribution of force, aspects contemplate a conforming surface for at least one platen. The conforming surface may be a resilient polymeric composition, such as a silicon-based material. Further, it is contemplated that the silicon-based material is a foamed composition having a durometer in a Shore 'A' hardness range of 0 to 40, in an example. This durometer allows for sufficient compliance while still effectively conducting pressure from the platen through the material.

The conformance of a compliant material may also be influenced by a thickness of the material. In aspects, the conforming material is sufficiently thick to conform around the anticipated varied thicknesses of the materials to be pressed, but not so thick that the material is ineffective to transfer the compression force and/or thermal energy in a heat press configuration. Therefore, in the use of forming portions of an article of footwear or an article of apparel, it is contemplated that the conforming material on a platen has an uncompressed thickness in a range of 2 mm to 8 mm, in an example. Within this range, the conforming material may have a compressed thickness that is 30%-70% that of the uncompressed thickness when pressing a component for use in an article of footwear to achieve a sufficient compression and/or heat transfer to the pressed materials.

In yet other aspects, it is contemplated that the closed loop feedback system is capable of maintaining a consistent pressure, and in the case of a heat press, a consistent temperature. As will be discussed, sensors, such as a load cell and/or thermal coupler, measure a variable and provide that reading to a computing device that instructs one or more changes to be made. For example, a load cell measure an amount of force being applied through an actuator to a platen. The system, in an exemplary aspect, is effective to maintain a desired pressure, even with a state-changing material under compression, within plus or minus 0.025 PSI of the target pressure. This narrow range of pressure deviation aids in achieving a short cycle time and a reduction in material defects from the pressing operation. Similarly, the closed feedback loop on a heat press system is effective for maintaining a temperature of a platen within plus or minus 0.025 degrees Celsius. This narrow range of temperature deviation aids in achieving a short cycle time and a reduction in material defects from the pressing operation.

As will be disclosed in greater detail, aspects contemplate methods and system for pressing an article with a closed-loop feedback press to quickly and effectively join two or more materials.

FIG. 1 depicts an example of a system 100 for pressing an article with a closed loop feedback system, in accordance with exemplary aspects hereof. The system 100 is comprise of a hot press 102, a cold press 104, and a controller 106 logically coupled thereto by one or more logical couplings 108. While the system 100 is depicted with both the hot press 102 and the cold press 104, it is understood that either of the presses may be omitted from the system 100. Additionally, it contemplated that the system 100 may be comprised of any number of the hot press 102 and/or the cold press 104.

As depicted in FIG. 1, a material flow direction extends from the hot press 102 to the cold press 104 such that an article is first pressed in the hot press 102 and then pressed or maintained compressed in the cold press 104. This order of operation may be adjusted, in an example the order of operation allows for efficient use of the system 100 through a quick thermal activation of an adhesive in the hot press 102 followed by a setting (e.g., curing, cooling) of the thermally-activated adhesive while under compression in the cold press. This transfer from the hot press 102 to the cold press 104 allows the hot press 102 to maintain a relatively consistent temperature without having to be cooled to allow for the thermally-activated adhesive to set and allows the hot press to press and thermally activate a second article while a first article if setting in the cold press 104. Therefore, for increased throughput with reduced cycle times, the system 100 of FIG. 1 includes both the hot press 102 and the cold press 104.

The hot press 102 is a closed-loop feedback press in both a pressure system and a temperature system. Stated differently, the hot press 102 adjusts a position of one or more platens in response to a measured pressure applied to the platens without human intervention, which allows for tighter pressure tolerance maintenance and real-time adjustments. Additionally, the hot press 102 leverages a thermometer or other thermal measuring device (e.g., infrared thermometer, thermocouple) to determine a temperature of one or more portions of the hot press and appropriately adjust a thermal generation (e.g., heating element) to maintain an intended or desired temperature in real time without human intervention, which allows for tighter temperature tolerances to be maintained during a pressing operation than a non-closed-loop feedback system The hot press 102 is comprised of a frame 110 from which the other components are supported. The hot press 102 is comprised of both a top platen 131 and a bottom platen 121. One or both of the top platen 131 and the bottom platen 121 adjust positions to converge on one another to generate the pressure used to compress the article for the pressing operation. This adjustment of position is accomplished from an actuator, such as an actuator 126, as will be discussed in greater detail hereinafter.

With focus on the bottom platen 121, a base 112 is joined with the frame 110 to support the bottom platen 121 and the forces transferred therethrough. The base 112 extends into a bottom member 114, which may optionally be a load cell. The bottom member 114 as a load cell may be omitted in some examples as a top load cell 132 may be solely used. Alternatively, the bottom member 114 as a load cell may be exclusively used and the top load cell 132 may be omitted in some examples. A load cell is a mechanism capable of measuring a force (e.g., load) exerted through the load cell. In an example, a load cell is a transducer that creates an electrical signal whose magnitude is directly proportional to a force being measured. Examples of a load cell include, but are not limited to, a hydraulic load cell, a pneumatic load cell, a strain gauge load cell, a piezoelectric load cell, and/or a capacitive load cell. A load cell is effective to capture an amount of force being transferred therethrough to an article being pressed. The force measured at a load cell may be converted to a pressure experienced by the article based on a distribution area (e.g., platen size) over which the pressure is spread. As the article changes states or deforms (e.g., melting of a thermally-activated adhesive) a thickness of the article may change (e.g., reduce) causing a reduced compression on the article between the top platen 131 and the bottom platen 121. This change in article thickness and resulting reduced compression can lead to a longer press time for a target temperature to be reached by the article and/or for sufficient bonding to occur. As a result, a load cell is capable of detecting a change in the compression through a deviation in force transferring through the load cell. In response to the load cell detecting a reduction in force, a signal may be communicated from the load cell to the controller 106. The controller 106 in response may instruct the actuator 126 to change a position (e.g., lower) of the top platen 131 that increases the force exerted through the load cell as the top platen 131 and the bottom platen 121 compress the article therebetween.

As stated earlier, a single load cell may be implemented, such as the top load cell 132 or the bottom member 114 as load cell. Or, in an optional and alternative example, two or more load cells may be implemented to measure a force passing therethrough and a resulting compression on the article may be determined. In the example, of FIG. 1, only the top platen 131 is moveably positioned by an actuator, but other aspects contemplate the bottom platen 121 also (or exclusively) being positioned by an actuator. Therefore, any combination (e.g., number, position, collection) of actuators and/or load cells are contemplated to achieve a closed-loop feedback system for applying a compressive force to an article.

The bottom member 114 joins with a bottom consolidation plate 116. The bottom consolidation plate consolidates forces transmitted through supports 118 from the bottom platen 121. In an example, supports 118 are rigid members. The supports 118 may be positioned at periphery locations of the bottom platen 121 to provide a stable platform. The supports 118 transfer a load from the bottom platen 121 to the bottom consolidation plate 116. In the example of FIG. 1, the consolidation plate allows for the collective force transmitted from the supports 118 to be measured by the bottom member 114 as an optional load cell through the consolidation effect provided by the bottom consolidation plate 116. The consolidation plate is a rigid material, such as steel, that has minimal deformation and flex that could skew force measurements by the bottom 114 when a load cell in those scenarios where a bottom load cell is implemented.

The supports 118 extend from the bottom platen 121. The bottom platen 121 is comprised of a bottom plate 120, a bottom heating plate 122, and a bottom contacting material 124. The bottom plate 120 may be a rigid plate, similar to the bottom consolidation plate 116, and effective to support the bottom heating plate 122 and the bottom contacting material 124 during a compression of the hot press 102. The bottom plate 120 may be formed from a metal, such as steel.

The bottom heating plate 122 is a thermal source. The bottom heating plate may be comprised of one or more heating elements. A heating element may be effective to convert electrical energy to thermal energy through resistance or induction. One or more heating elements may be included in the bottom heating plate 122. It is contemplated that a plurality (i.e., 2 or more) of heating elements may be included in the bottom heating plate 122. The plurality of heating elements allows for zonal control of heating in the bottom platen 121. The zonal control may be used to maintain an equal temperature across a surface area of the bottom platen 121 or it may be used to provide a differential temperature across a surface area of the bottom platen 121. The differential temperature may be leveraged for an article having different thicknesses at different locations and/or for an article constructed from different materials having different deformation temperatures (e.g., melt temperature, state-change temperature, glass-transition temperature, ignition temperature). As such, it is contemplated that the bottom platen 121 may provide a homogenous temperature across a surface area or it may provide an intentionally varied temperature across a surface area.

The closed-loop feedback for temperature comprises a thermometer. A thermometer is a mechanism for measuring a thermal energy or temperature of a component of the system. Examples of a thermometer contemplated include, but are not limited to, thermocouple, resistance thermometer, thermistor, quart thermometer, infrared thermometer, and/or thermal expansion thermometer. The bottom platen 121 is comprised of a thermometer. The thermometer is effective to measure a temperature of the bottom platen 121 at one or more locations. For example, a temperature of the bottom platen 121 at a material contacting surface of the bottom contacting material 124 may be measured to account for thermal loss from the heating elements through the bottom contacting material 124. Alternatively or additionally the temperature may be measured at the heating elements or at the bottom heating plate 122. As with the example above having zonal heating or a plurality of heating elements, it is contemplated that a plurality of thermometers may be used in connection with one or more of the zones. In an example, each heating zone may have a dedicated thermometer allowing for a one-to-one closed-loop feedback between a heating element and a thermometer.

The bottom contacting material 124 forms a material contacting surface and overlays the bottom heating plate 122 on an opposite side to the material contacting surface. The material contacting surface is a surface presented to an article (e.g., a portion of a shoe upper) that is intended to be pressed. The bottom contacting material 124 may be a sacrificial, removable, and/or disposable material. For example, the bottom contacting material 124 may be removable such that contaminants (e.g., adhesive, deformed material) that could damage or interfere with the processing of future articles could be removed from the press by removing of the bottom contacting material 124 from the press. In an aspect, the bottom contacting material 124 is maintained to other portions of the bottom platen 121 through a heat-activated adhesive. The heat-activated adhesive may be activated at temperature that is above a traditional temperature of operation for the hot press 102 while pressing an article. For example, the heat-activated adhesive joining the bottom contacting material 124 may be activated at temperatures 50 degrees Celsius, 100 degrees Celsius or more above an operating temperature of the hot press 102 when pressing an article. In an example, the bottom contacting material 124 is a polymeric material. In a specific example, the bottom contacting material 124 is formed from polytetrafluoroethylene (PTFE). The bottom contacting material 124 is a substantially non-compressible material in a first example. In an alternative example the bottom contacting material 124 is a resilient compressible material, such as will be discussed in connection with a top contacting material 138.

The hot press 102 as depicted in FIG. 1 has a statically positioned bottom platen 121. However, alternative aspects contemplate a positionable bottom platen, such as through an actuator. The ability to position the bottom platen may allow for a removal of one or more moveable elements on the conveyance system that will be discussed hereinafter.

The hot press 102 is also comprised of the top platen 131. The top platen 131 is comprised of a top plate 134, a top heating plate 136, and a top contacting material 138. The top contacting material forms a material contacting surface of the top platen 131. As discussed with the bottom contacting material 124, a material contacting surface is a surface of the platen exposed to and forming a surface for contacting an article to be compressed between the platens. The top contacting material 138 may be any material, such as a polymer-based material. In a specific aspect, the top contacting material 138 is a foam material. In an example, the top contacting material 138 is a silicon-based composition. In a specific example, the top contacting material 138 is a silicone-based material, such as a silicone-based foam material.

Figure 4:
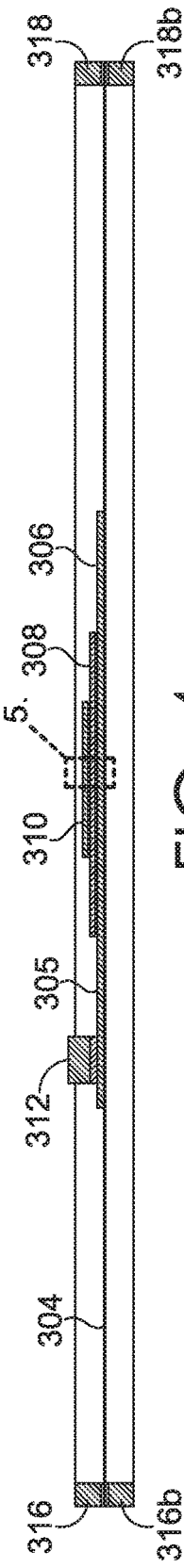
FIG. 4 depicts a cross sectional view of the frame assembly from FIG. 3, in accordance with aspects hereof.

The top contacting material 138 may be resilient and compressible. The compressibility of the material translates to a conformance to varied thicknesses of the article to be compressed, as seen in FIG. 4 hereinafter. The conformability of the top contacting material 138 aids in the effectiveness of the hot press 102 to press the article without unintentionally deforming or otherwise marking the article while still achieving an effective bonding. For example, having the top contacting material 138 a conforming material, a more uniform pressure may be applied a varied thickness surface as the top contacting material 138 compresses and conforms to areas of greater thickness such that the top contacting material 138 contacts the surface of the article as the article thickness transitions. Stated differently, a conforming material allows for more uniform and complete contact and pressure across a varied thickness article than a non-conforming material contacting surface.

A suitable amount of conformance of the top contacting material 138 is represented through a durometer measure. In specific examples that are appropriate for hot pressing of an article for use in an article of footwear and/or an article of apparel, include a Shore 'A' hardness of 0 to 40. Shore 'A' hardness durometer type as provided herein is measured using the ASTM D2240-15e1 standard for the Durometer type 'A'. In a specific example, the durometer of the top contacting material 138 has a Shore 'A' hardness of 10 to 20. These durometer ranges are effective to conform to the article being pressed by the hot press 102 while still effectively transferring the compression force.

With the given durometer ranges, it is contemplated that the top contacting material 138 has a thickness of 2 millimeters (mm) to 8 mm. This thickness of the top contacting material 138 allows for sufficient deformation and conformance to the article being pressed. For example, it is contemplated that the top contacting material 138 has a compressed thickness that ranges from 30% to 70% of the uncompressed thickness when an article is being pressed by the hot press 102. This level of compressibility provide sufficient conformance without sacrificing the thermal conductivity of the top platen 131 from the top contacting material 138. As the top contacting material 138 is thicker, additional insulation results from the conveyance of thermal energy from the top heating plate 136 towards the article being pressed.

However, in an example, the thermal insulating aspect of the top contacting material 138 is intentional. In some aspects an intended temperature differential between the top platen 131 and the bottom platen 121 is provided. The temperature differential may be achieved through varied outputs of thermal energy from the respective heating plates. Alternatively, the temperature differential is achieved through an insulation attribute of the top contacting material 138 relative to the bottom contacting material 124. For example, the top contacting material 138 is less thermally conductive than the bottom contacting material 124, in an example. This lower thermal conductivity allows for a thermal difference to be maintained between the material contacting surfaces of the top platen 131 and the bottom platen 121.

A temperature differential between the top platen 131 and the bottom platen 121 is advantageous in aspects. For example, the article may be positioned in the hot press 102 such that materials having a lower temperature tolerance (e.g., lower deformation temperature, lower melt temperature, lower deterioration temperature) are oriented toward the top contacting material 138 than material in closer proximity to the bottom contacting material 124. In a specific example, a shoe upper component having an exterior surface of the to-be-formed shoe may be formed from an aesthetically pleasing material (e.g., cosmetic material) that is more susceptible to damage or defects caused by heat than a more interior material of the to-be-formed shoe, such as an intermediate material or a shoe liner material. As such, having a temperature differential between the top platen 131 and the bottom platen 121 allows for materials having different thermal response temperatures to be pressed concurrently as a common article without adversely deforming or otherwise creating a defect in the materials while minimizing the press time to increase system throughput. In an example, the top platen material contacting surface is 5 degrees Celsius to 15 degrees Celsius less than the bottom platen material contacting surface. In an example, the top platen material contacting surface and the bottom platen material contacting surface are both at a temperature above a temperature at which an adhesive layer of the to-be-pressed article bonds with another material (e.g., a melting temperature). It is contemplated that the bottom platen material contacting surface is maintained below a deformation temperature (e.g., melt temperature, deterioration temperature, glass transition temperature) of the portion of the article in contact with the bottom platen material contacting surface.

The top heating plate 136 is similar to the bottom heating plate 122, in an example. The top heating plate 136 includes one or more heating elements. The heating elements are effective to generate thermal energy in the form of heat that is effective to raise a temperature of an article being pressed by the hot press 102. The heating elements are controllable through the closed-loop feedback system in a manner similar to that described with respect to the bottom platen 121. For example, one or more thermometers may monitor and provide feedback to a controller to adjust a temperature of the top heating plate 136. Further, it is contemplated that two or more heating zones may exist in the top heating plate 136 that are individually or uniformly controlled. In the closed-loop feedback system of the present application it is contemplated that a consistent temperature is maintained at the material contacting surfaces of the platens. A consistent temperature for purposes of the present disclosure is in a range of plus or minus 0.025 degrees Celsius. This level of consistency is achieved by having the closed-loop feedback system of a thermometer monitoring the temperatures and a controller controlling the heating elements in response to the measured temperature(s). This level of consistency allows for temperature closer to deformation temperature or critical temperatures of the article to be used without causing a deformation or deterioration of the article materials as the temperature is controlled within a tight temperature range. An ability to operate with this level of consistency near the critical temperatures of the material allows the system to operate with faster cycle times that increase the throughput of the system. Systems not having a closed-loop feedback system may instead only maintain a temperature that is within a range of target that is plus or minus 3 degrees C., which is insufficient for aspects contemplated herein.

The top plate 134 provides a rigid structure for transferring the force applied through the actuator 126 to the article being pressed without excessive flexing or deformation. This rigidity may be achieved with a metallic material, such as steel. The top plate 134 serves as a connection of the top platen 131 with the force generation of the actuator 126. The top plate 134 also may serve as a connection for one or more stabilizers. The stabilizers aid in maintaining a parallel travel of the top platen 131 through stages of compression. The stabilizers are depicted as rod-like elements extending from the top plate 134 through the frame 110 that provide parallel travel of the stabilizers, which translates to a parallel positioning of the top platen 131 as it moves through a range of vertical positions. The stabilizers aid in ensuring a consistent application of force across the article being pressed even when the article has varied thicknesses or is oriented in an offset manner to the top platen 131. In some examples, the stabilizers are referred to a linear bearings.

A load cell 132 is depicted as extending between the top platen 131 and a consolidation plate 130 that is joined with a piston 128 (or pistons) of the actuator 126. The load cell 132 is similar to the load cell previously discussed. The load cell 132 is effective to measure an amount of force transferred from the actuator 126 to the top platen 131. The consolidation plate 130 is optional in some examples. However, in the configuration of FIG. 1, the actuator 126 has more than one piston 128 and therefore the consolidation plate 130 is effective to consolidate the forces of the various pistons to be measured by a common load cell. On other examples, the actuator may have a single piston applying a force. In a single piston example, the load cell may be positioned in line with the piston and the top platen 131 without the consolidation plate 130, for example.

The actuator 126 is capable of generating a linear movement that is converted into a force for compression. The actuator 126 may be hydraulic, pneumatic, or mechanical actuator. In an example, the actuator 126 is a screw actuator that converts a rotational force to a linear force through a screw mechanism. The screw actuator may be a standard planetary roller screws, inverted roller screws, ball screws, and the like. In a specific example, a screw actuator is used having a high tolerance nut assembly that allows for a reduced backlash due to the high precision between the screw and nut mating. To further drive efficiencies in the screw assembly of the actuator, it is contemplated that one or more the screw or the nut (or both) are coated in a friction reducing materials, such as PTFE. A lower backlash from the high precision mating of the screw and nut provides for greater control of the force applied by the actuator to the top platen 131. For example, if there is rotational movement of the screw (or the nut) by a servo motor before the screw engages with the nut because of low tolerances, the rotational energy is not converted into linear movement that affects the amount of pressure applied. Similarly, if after applying rotational energy a low tolerance between the screw and the nut allows for a change in near position with affecting the rotational position of the screw (or nut). As such, when achieving a consistent pressure through a closed-loop feedback system of a controller and a load cell, minimizing of backlash of the actuator additionally allows for greater consistency of the force.

Multiple pistons 128 may be used in connection with the actuator 126. The multiple pistons aids in a reduction in backlash in one example, allows for greater control over linear motion as the piston diameters may be smaller while achieving a similar force than when done with a single piston. However, it is contemplated that some aspects leverage a sole piston configuration.

The hot press 102 is effective to compress an article with a force up to 15 pounds per square inch (psi). In an example, the press operates in a pressure range of 6-10 psi. At this range, an effective compression of an article of footwear or an article of apparel may be bonded without over compressing that may cause bleeding or other defects resulting from over compression. The closed-loop feedback system including the load cell 132 and the controller 106 in connection with the actuator 126 allows for a force tolerance range of plus or minus 0.025 psi, in an example. As with the temperature tolerance range, a consistent pressure allows the system to operate at maximum pressures without causing defects, which increases the system throughput. As such, the closed-loop feedback system of the force generation able to maintain a plus/minus pressure range of 0.025 psi is advantageous to the system. In yet other examples, the press operates at 8 psi or less with a compression of the top contacting material 138 of 2-3 mm while having a durometer of Shore 'A' type 12-18 range. With this configuration an effective bond between an article without causing bleeding is achieved in an example.

The hot press 102 is also comprised of a conveyance system effective to convey and position an article within the system 100. As depicted and as will be shown in FIGS. 2 and 3, the conveyance system and the article, in an example, are configured to use a frame for conveying and positioning the article. The conveyance system includes a conveyor 140 having a first end 142 and a second end 144 with a material flow direction traditionally extending from the first end 142 to the second end 144. As will be more clearly depicted in FIGS. 6-8, the conveyance system is configured to adjust vertically relative to the bottom platen 121 by motion of actuators 146. The vertical positioning allows the article to be placed on and supported, at least in part, by the bottom platen 121 for effective pressing by the system. Additional details of the conveyance system will be provided in connection with FIGS. 2 and 6-8 hereinafter.

The system 100 is depicted as including the cold press 104 in a material flow downstream position from the hot press 102. As used herein, a hot press is a press effective to transfer thermal energy to the article being pressed. A cold press is a press that is not actively adding thermal energy to the article being pressed, but it provides a compression force. As such, the difference between the hot press 102 and the cold press 104 is an active heating element. Therefore, a hot press may be considered a cold press when heating elements, such as the top heating plate 136 and the bottom heating plate 122, are not activated. Similarly, a cold press may be similar in structure and design to a hot press with the heating elements, such as the heating plates, omitted altogether, as is shown in the cold press 104. Therefore, the cold press 104 includes similar components as previously discussed in connection with the hot press 102, but labeled with a "b" for differentiation purposes. Absent from the cold press 104 relative to the hot press 102 is a top heating plate and a bottom heating plate. As the cold press 104 is intended to provide a compressive force on the article while one or more thermally-activated adhesive cool, heating elements are not included in the cold press. Also absent are the associated thermometers of the temperature regulating closed-feedback loop system of the hot press 102. In this example, the cold press operates at ambient temperature, which may be at least 80 degrees C. less than the top platen.

The cold press 104, unless expressed to the contrary, is formed from components as similarly discussed in connection with the hot press 102. For example, the cold press 104 is comprised of a base 112b, a bottom member 114b, a bottom consolidation plate 116b, support 118b, a bottom platen 152, a bottom plate 158, a bottom contacting material 160, a top platen 150, a top contacting material 156, a top plate 154, a load cell 132b, a top consolidating plate 130b, pistons 128b, and actuator 126b, and a conveyor 140b having a first end 142b and a second end 144b. Those elements numerated with a 'b' are similar to similarly numbered elements from the hot press 102. The top platen 150 and the bottom platen 152 of the cold press 104 are similar to the top platen 131 and the bottom platen 121 of the hot press 102 except for the omission of the hot plates and associated components, such as thermometers. For example, the bottom plate 158 is similar to the bottom plate 120 in function and material. The bottom contacting material 160 and the bottom contacting material 124 are similar in function and material. The top contacting material 156 and the top contacting material are similar in function and material. The top plate 154 and the top plate 134 are similar in function and material. However, it is contemplated that dimensions, size, material, and connections may be altered between the hot press configuration and the cold press configuration.

The controller 106 and the logical couplings 108 are depicted as connecting the hot press 102 and the cold press 104. It is depicted in this manner for illustration purposes, but it is understood that the couplings could be wireless or in other configurations. Further, while a single controller 106 is depicted, it is contemplated that any number of controllers logically coupled or not logically coupled may also be included. The controller 106 includes a computing processor and memory that are effective to receive inputs from one or more components and to send instructions to one or more components. For example, the controller 106 receives measurements from the load cell 132 and directs the actuator 126 to adjust a position of the top platen 131 and therefore pressure exerted by the top platen 131 according to a recipe for the article. A graphical representation of a recipe will be depicted in FIG. 9 hereinafter. Another example of an implementation of the controller 106 is receiving one or more measurements from a thermometer and then instructing one or more heating elements, such as heating elements of the top heating plate 136 and the bottom heating plate 122 to adjust accordingly to maintain a temperature as prescribed by the recipe. The controller 106 is also effective to control the conveyance mechanisms for conveying and positioning the article. For example, the conveyance mechanism may start and stop at various locations in response to a detected or known location of the article, as controlled by the controller 106. Further, the conveyance mechanism may adjust a vertical position of the article in response to a processing step sequence or a position of the article, as controlled by the controller 106 instructing one or more actuators, such as the actuators 146.

The logical coupling 108 is connection for communicating information. The logical coupling may be wired or wireless. A wired logical coupling may be any communication format, such as a local area network. A wireless logical coupling may implement any communication protocol, such as those commonly used over Wi-Fi, Bluetooth, and the like. As such, it is contemplated that any communication standards may be used in connection with the logical couplings that connect, logically, one component with another component in the system.

Figure 2:
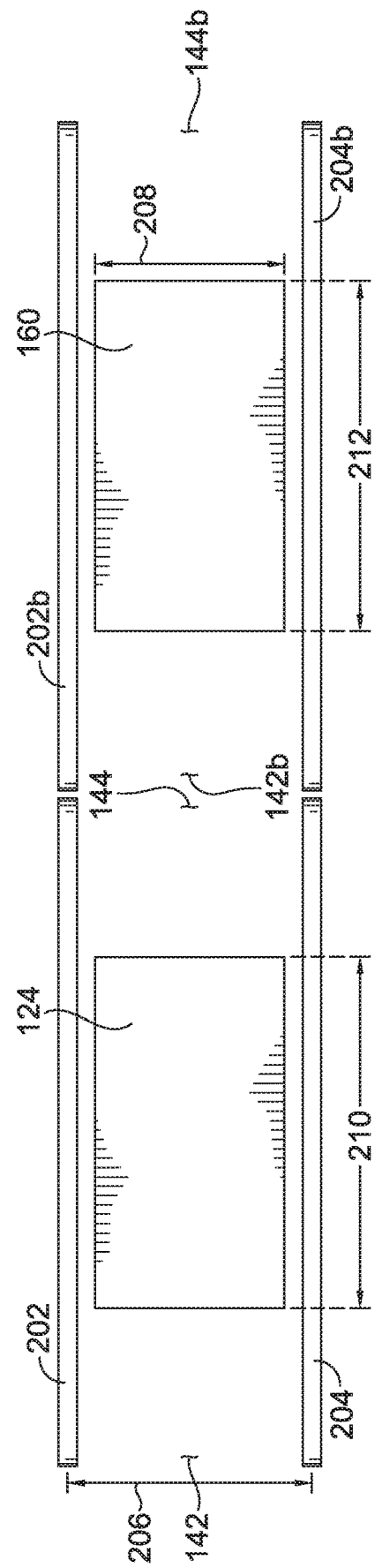
FIG. 2 depicts a plan view of a conveyance portion of the system from FIG. 1, in accordance with aspects hereof.

FIG. 2 depicts a plan view of a conveyance portion of the system 100 from FIG. 1, in accordance with aspects hereof. The first conveyor having the first end 142 and the second end 144 is comprised of a first track 202 and a second track 204. A track is a belt, chain, mesh, links, or other surface that is effective to move an article through a press. The first track 202 and the second track 204 are contemplated to operate in unison such that as one track conveys, the second track similarly conveys. This may be accomplished through a common drive motor, such as a servo or other stepper motor configuration whose drive force is distributed to both the first track 202 and the second track 204. In an alternative example, separate drive sources, such as a separate servos or stepper motors may independently drive each track, but their movements may be coordinated. The coordinated movement of the first track 202 and the second track 204 allows for the parallel movement of the article relative to the platens, as represented by the bottom contacting material 124. The first track 202 and the second track 204 are associated with the hot press from FIG. 1. A first track 202b and a second track 204b are associated with the cold press of FIG. 1.

The first track 202 and the first track 202b are linearly aligned in the depicted example to serve as a substantially continuous movement mechanism. Similarly, the second track 204 and the second track 204b are linearly aligned in the depicted example to serve as a substantially continuous movement mechanism. The track associated with a first press and the track associated with a second press are separate tracks, in an example, to allow independent vertical movement of the track in connection with the individual presses, as will be discussed in connections with FIGS. 6-8. For example, the first track 202 and the second track 204 may be in a lowered configuration allowing an article to be pressed on the bottom contacting material 124 while the first track 202b and the second track 204b are in a raised configuration in preparation for receiving the article from the first track 202 and the second track 204 after the pressing operation.

The first track 202 and the second track 204 are spaced apart a width 206. The platens that the conveyance mechanisms convey over have a width 208. To prevent interference in the movement of the platens and the pressing of an article, it is contemplated that the width 206 is greater than the width 208 to allow the conveyance mechanism to raise and lower above and below the platens to position an article for pressing. Additionally, the first track 202 and the second track 204 have a length in the material flow direction between the first end 142 and the second end 144 that is greater than a length of the platen having a length 210. This greater length of the conveyance mechanism allows for the conveyance and positioning of the article into, through and out of the press without interference with the platen.

Figure 3:
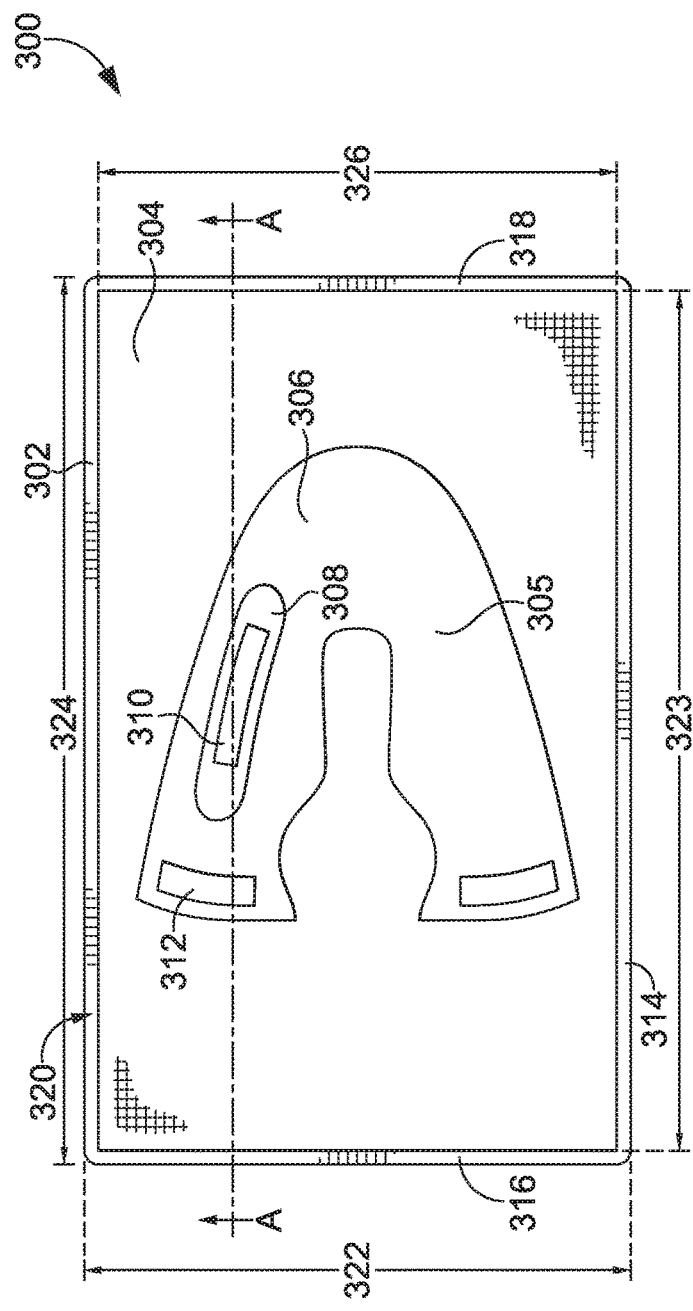
FIG. 3 depicts an example of a frame assembly having an article, in accordance with aspects hereof.

FIG. 3 depicts an example of a frame assembly 300 having an article as a shoe upper 305, in accordance with aspects hereof. The frame assembly 300 is effective to be conveyed through a press by a conveyance system, such as the first track 202 and the second track 204 of FIG. 2. Further, the frame assembly 300 is effective to aid in positioning and maintaining the article at a platen for pressing and the automated movement of the article into the press, through the press, and out of the press. The frame assembly 300 is comprised of a frame 302 formed from a plurality of frame members 314, 316, 318, and 320. The frame members may be portions of a continuous (i.e., monolithic) material or they may be discreet members that are joined together to form the frame 302. The frame 302 may be formed from any material, such as a polymer composition or a metallic composition. The frame 302 may be rigid and able to withstand a plurality of duty cycles for different articles.

The size of the frame 302 is correlated with the size of the platens and the conveyance system of FIGS. 1 and 2, in an example. The frame 302 has an outside width 322 and an inside width 326. The frame 302 has an inside length of 323 and an outside length 324. The inside width 326 and the inside length 323 are contemplated as being greater than the platen width and length, respectively. Stated another way, it is contemplated that the frame 302 is sized such that a platen may extend into an interior space of the frame such that the frame does not interfere with a pressing of an article between two platens while the article is associated with the frame. The outside width 322 is sized such that the frame 302 is supported by the conveyance system as depicted in FIG. 2. For example, the outside width 322 is similar to the conveyor width 206 of FIG. 2.

The frame assembly, in an aspect, includes a foundation material 304. The foundation material 304 may be part of the frame assembly 300 independent of the article to be pressed. In an alternative aspect, the foundation material 304 is present with the frame when the article is maintained with the frame. Stated differently, the foundation material 304 may either be part of the frame independent of the article or the foundation material 304 may be part of the article to be pressed and associated with the frame only when using the frame to convey the article. The foundation material 304 may be any materials, such as a textile, a film, a sheet, or the like. In an example, the foundation material is a non-woven textile formed from a material having a higher deformation temperature (e.g., melt temperature) than an operating temperature of a hot press and/or the material of the article to be thermally activated by the hot press. The foundation material 304 provides a surface onto which the article is supported and maintained during transportation through one or more presses. In a specific example, the foundation material 304 provides a surface to which the article is temporarily or permanently secured to maintain a consistent position relative to the frame 302 during transit and/or pressing operations.

The article is depicted as an upper 305. An upper is the portion of an article of footwear (e.g., a shoe) effective to secure a wearer's foot to a sole of the article of footwear. In some examples the uppers is a textile, polymer film, leather or other traditional materials that extend above a sole portion of the footwear. The upper 305 may be formed from any material. For example, the upper 305 may be a textile in the form of a woven, braided, non-woven, or knit material. Further, the upper 305 may be formed from any material composition. The material compositions include, but are not limited to, polymer materials (e.g., nylon, polyester), organic materials (e.g., cotton, wool), leather, and the like. It is contemplated that the upper 305 may be formed from a variety of materials at different locations. The upper 305 may be permanently secured with the foundation material 304, temporarily secured with the foundation material 304, or not secured with the foundation material 304. It is contemplate that the entirety of the article to be pressed is maintained within the frame 302 in an example. Alternatively, it is contemplated that less than a whole of the article to be pressed is maintained within the frame 302, but the portion maintained within the frame is a portion to be pressed.

The article is contemplated as comprising a plurality of material layers that are to be joined through a pressing activity. In the example of FIG. 3, the article is the upper 305 formed from a base material 306 having a plurality of overlays. Any number of overlays in any shape, size, orientation, and/or location are contemplated. The overlay may be a similar material to the underlying material or it may be a different material to the underlying material. The overlay may be formed from a polymeric composition, an organic composition, and/or a metallic composition. The overlay may be aesthetic and/or functional (e.g., cushioning, rigidity, tension transferring, stiffening). The overlay may be intended to be bonded to another material or the overlay may be intended to integrate Further, as will be shown in FIGS. 4 and 5, it is contemplated that an adhesive may be present between one or more layers of the article. It is this adhesive that may be activated to join the materials in the presence of heat and/or pressure from a pressing operation. A first overlay 308, a second overlay 310, and a third overlay 312 are depicted.

FIG. 4 depicts a cross sectional view of the frame assembly 300 from FIG. 3 along a cut line A-A, in accordance with aspects hereof. The frame is depicted as having a top frame portion and a bottom frame portion. The members 316 and 318 form a portion of the top frame. Corresponding members 316b and 318b for a portion of the bottom frame. The two-part frame is option. A two-part frame as depicted in FIG. 4 provides an example of securing the foundation material 304 with the frame through a compression between the top frame and the bottom frame, as depicted in FIG. 4. Alternatively, it is contemplated that the frame does not have separate top and bottom portions and the foundation material, when used, is secured my other means, such a hooks, snaps, adhesive, and/or other compression arrangements (e.g., channel and fill).

The foundation material 304 is depicted as being maintained in a taut configuration within the frame such that the foundation material 304 supports the article (i.e., upper 305). The upper 305 has a first collection of overlays positioned on the base material 306. This first collection is depicted as including the first overlay 308 and the second overlay 310. As is easier to see in FIG. 5, additional layers of bonding material, such as a thermally-activated adhesive, are positioned between the base material 306, the first overlay 308 and the second overlay 310. A bonding material may also be referred to as an adhesive material herein.

A bonding material is a material effective to bond a first material with a second material. The bonding material may be activated by heat and/or pressure in an example. Therefore, in response to heat and pressure from a hot press, the bonding material is effective to bond one or more materials together. Examples of a bonding material include, but are not limited to, a polymeric material having a deformation temperature (e.g., melting temperature) that is able to be obtained within a heat press. The deformation temperature of the bonding material is less than a deformation temperature of the materials to be bonded by the bonding material in an example. This difference in deformation temperatures between the to-be-bonded materials and the bonding material allows for the to-be-bonded materials to be bonded without unintentionally deforming.

The bonding material may be referred to as a "hot-melt adhesive." A hot-melt adhesive is a polymeric composition that changes from a first state (e.g., sheet-like configuration in a solid state) to a more viscous fluid-like state in the presence of thermal energy. Stated differently, the polymeric composition melts or otherwise changes to a more fluid state in response to a pressing operation contemplated herein. Following the pressing operation or following a portion of the pressing operation (e.g., removal of excess thermal energy), the polymeric composition solidifies and captures or adheres to portions of the to-be-bonded material.

In an example, the bonding material is elevated to a temperature of 117-130 degrees C. for at least 10 seconds to achieve a suitable bond for the upper 305 to be effective as an article of footwear. This temperature of the bonding material may be in contrast to a deformation temperature of the base material 306 that deforms at around 185 degrees C. Therefore, it is desirable in an example, to keep the material contacting surfaces of the platens below the deformation temperature of the base material, but above the target temperature for the bonding material (e.g., above 117 degrees C.).

FIG. 4 illustrates a thickness difference across the upper 305 resulting from the various overlay stacks. For example, the first overlay stack comprised of the first overlay 308 and the second overlay 310 shows a stepped thickness difference created by the different shape/size/orientations of the stacked overlays. As previously discussed with respect to the conformability of the top contacting material 138 from FIG. 1, the conformance allows the press to conform to the stepped thickness to uniformly apply pressure to the article as a whole even with a greater thickness caused by the overlay s tack in a specific location of the article. But for the conformance, the pressure applied by the press would be concentrated at the greatest thickness location of the article and would therefore potentially overly compress that portion of the article without sufficiently compressing other portions of the article having less thickness. Similarly, the conformance allows for effective conduction of thermal energy from the platen through contact between the conforming material and the less thick portions of the article. Therefore, the conforming quality of the material of the platen can aid in apply a more uniform pressure and temperature, which can limit bleeding and other defects when pressing an article having variable thicknesses.

Figure 5:
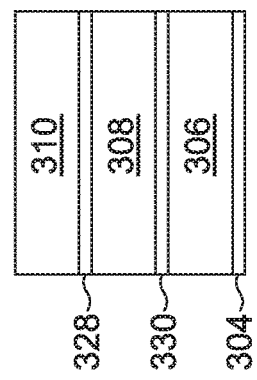
FIG. 5 depicts a magnified portion of FIG. 4, in accordance with aspects hereof.

FIG. 5 depicts a magnified portion of FIG. 4, in accordance with aspects hereof. Specifically, the second overlay 310, a bonding material 328, the first overlay 308, a bonding material 330, the base material 306, and the foundation material 304. The bonding material 328 and 330 may be the same bonding material or it may be a different bonding material. For example, the bonding material may be different based on the material to be bonded (e.g., compatibility of materials to be bonded). Additionally, the bonding material may be different such that they activate in response to different conditions, such as different deformation temperatures. For example, the bonding material 330 may have a higher melting temperature of the bonding material 328 as a result of a bottom platen operating at a higher temperature than the top platen and therefore different temperatures are achieved throughout the thickness of the article. The bonding material may be the same for the bonding material 328 and the bonding material 330, such that a uniform temperature or narrow temperature range is targeted through a thickness of the article.

FIG. 5 illustrates an absence of a bonding material between the base material 306 and the foundation material 304. In this example, the article is not secured to the foundation material. However, alternative examples contemplate the article being adhered or otherwise bonded with the foundation material to ensure a consistent position of the article during conveyance and pressing. It is contemplated that any combination of materials (e.g., overlays, bonding materials) may be used at any location in any number.

Figure 6:
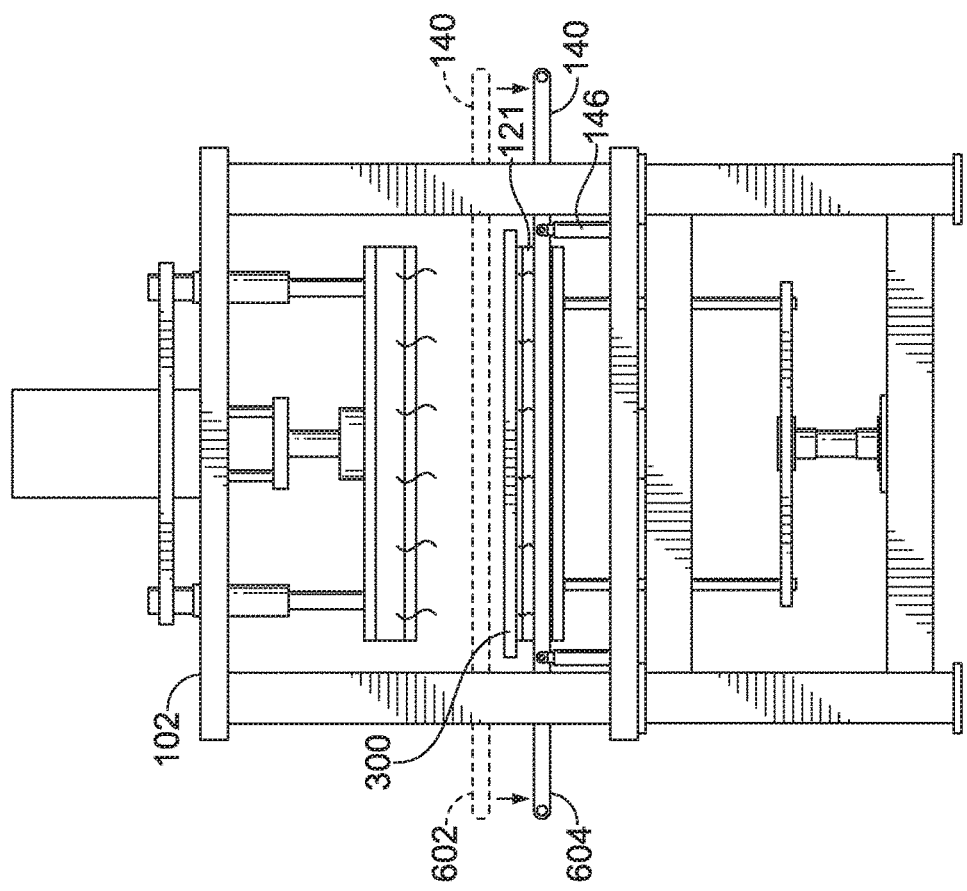
FIG. 6 depicts a press from FIG. 1 in a first configuration, in accordance with exemplary aspects hereof.

FIG. 6 depicts the hot press 102 from FIG. 1 in a first configuration, in accordance with exemplary aspects hereof. The first configuration includes the conveyor lowered by the actuators 146 from a first position 602 to a second position 604. The lowering of the conveyor 140 allows the frame assembly 300 to be positioned relative to the bottom platen 121. The positioning of the frame assembly 300 may include supporting the frame assembly 300 by the bottom platen 121, as is depicted in FIG. 6. In this example, the foundation material or article are resting on and supported directly by the contacting surface of the bottom platen 121 such that during a pressing operation the frame assembly does not interfere with a positioning change of one or more of the platens. In an alternative example, the conveyor 140 lowers to a position such that the bottom platen 121 may contact the article or the foundation material of the frame assembly 300, but the frame is still in contact with the conveyor 140. In this example, the conveyor 140 supports the weight of the frame (e.g., frame members 314, 316, 318, and 320 of FIG. 3), while the article may be supported or contacting the bottom platen 121.

Also depicted in FIG. 6 is the generation of thermal energy by the platens. As will be seen in FIG. 7, this thermal energy in connection with a compression allows for a bonding to occur between materials forming the article being pressed.

Figure 7:
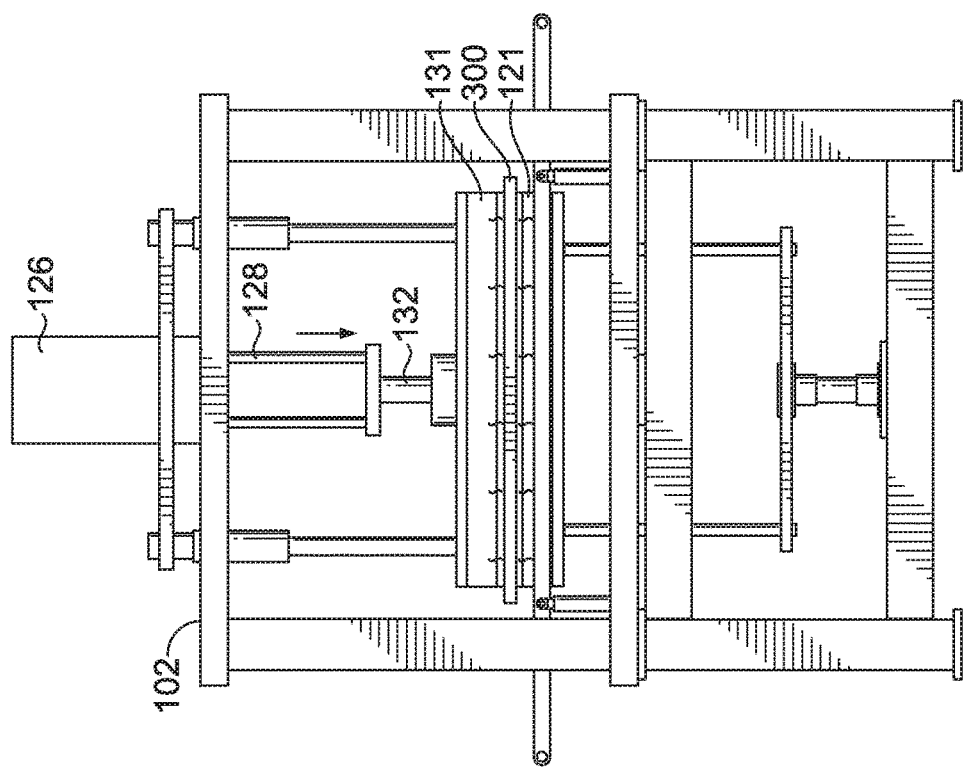
FIG. 7 depicts the press of FIG. 6 in a second configuration, in accordance with aspects hereof.

FIG. 7 depicts the hot press 102 of FIG. 6 in a second configuration, in accordance with aspects hereof. Specifically, a position of the top platen 131 is adjusted to create a compression of the article between the bottom platen 121 and the top platen 131. The position of the top platen 131 is changed by the actuator 126 causing an extension of the pistons 128 that moves the top platen into a pressure-generating positions to compress the article associated with the frame assembly 300. The amount of positional change created by the actuator 126 is adjusted, in part, by the force measured by the load cell 132. As previously discussed, the force created by the actuator may be determined from a recipe or program for the given article. Measuring of the force generated by the load cell 132 as part of a closed-loop feedback system allows for the relative position of the top platen 131 to be adjusted to achieve a desired force. An amount of time that the hot press 102 maintains this configuration may vary. In an example aspect, the hot press 102 maintains this configuration for 15 to 45 second when pressing a shoe upper. As will be discussed in connection with FIG. 9, variations in pressure may occur during this configuration to have an initial accelerated heating through higher pressure and then a reduced pressure portion as the materials approach a target temperature.

FIG. 8 depicts the hot press 102 of FIG. 7 in a third configuration, in accordance with aspects hereof. Specifically, the conveyor 140 returns to the first position 602 from the second position 604, which elevates the frame assembly 300 from the bottom platen 121 such that the frame assembly 300 may be conveyed out of the hot press 102 by the conveyor 140. Additionally, the top platen 131 is raised in position by the actuator 126 retracting the pistons (e.g., screws in an actuator or members extending from a screw). The retraction of the top platen 131 further clears a pathway for the conveyance of the frame assembly 300 out of the hot press 102.

While FIGS. 6-8 depict an example series of steps, it is contemplated that additional steps could be depicted. For example, variations in pressure applied during a pressing operation could be depicted with slight, if not noticeable by human perception, position changes of the top platen 131. Additionally, the conveyor 140 may be positioned at different locations, depending on the amount of support the conveyor 140 is to provide the frame or frame assembly 300 during various stages of the pressing operation.

Figure 9:
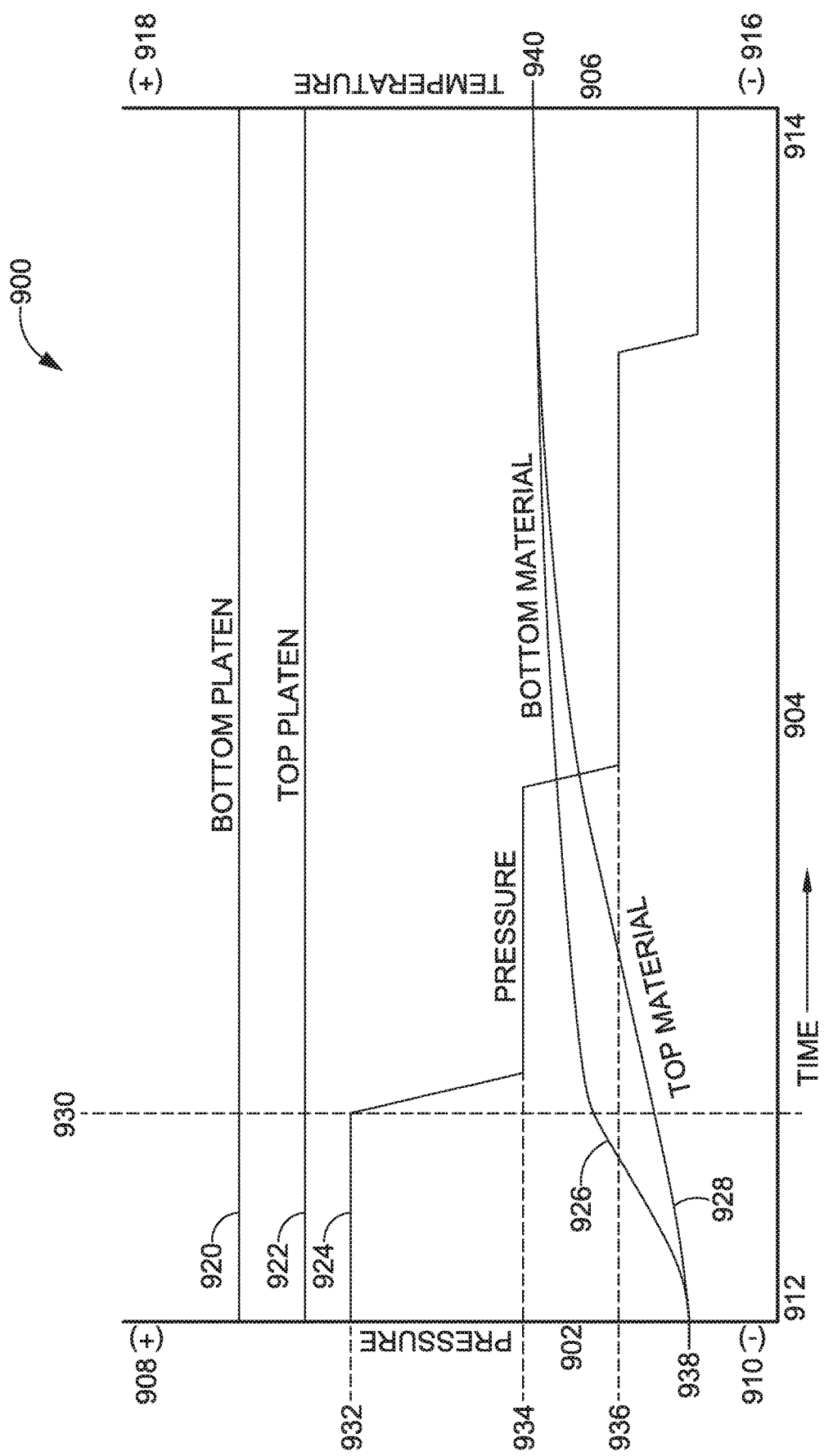
FIG. 9 depicts a process chart for an example pressing operation, in accordance with aspects hereof.

FIG. 9 depicts a process chart 900 for an example pressing operation, in accordance with aspects hereof. The chart includes a vertical axis 902 on a left side representing an amount of pressure applied. The chart includes a vertical axis on a right side representing a temperature variable. The chart includes a horizontal axis on a bottom representing a time variable. The pressure axis 902 has a higher pressure 908 at the top and a lower pressure 910 at the bottom. The temperature axis 906 has a higher temperature 918 at the top and a lower temperature 916 at the bottom. The time axis has an earlier point 912 and a later point 914. Further a line 920 represents a temperature of a bottom platen over time. A line 922 represents a temperature of a top platen over time. A line 924 represent a pressure experienced between the top platen and the bottom platen over time. A line 926 represent a temperature over time of a bottom material (e.g., base material 306 of FIG. 4) forming the article being pressed. A line 928 represent a temperature over time of a top material (e.g., second overlay 310 of FIG. 4) forming the article being pressed. A line 930 represent a point in time associated with a position change of a top platen that causes a reduction in pressure experienced by the pressed article.

Looking at the lines 920 and 922, in the example recipe or process of FIG. 9, the bottom platen is maintained at a temperature slightly above that of the top platen through the duration of the pressing operation. This temperature differential, as previously discussed, is effective to reduce bleeding of bonding materials and protecting of the top materials from excessive heat. As a reminder, some aspects contemplate the top material of the article to have a lower deformation temperature or to be more responsive to thermal energy such that an unintentional deformation may occur at higher temperatures. For these reasons, the top platen is contemplated as having a conforming material (e.g., silicon foam) forming the contacting surface. The conforming material may aid in producing the temperature differential through a relative increase in thermal insulation capabilities as compared to a material forming the contacting surface of the bottom platen. The temperature differential may also be accomplished through a varied output of heating elements in the top platen relative to the bottom platen. The temperature for the bottom platen and the top platen are depicted as staying consistent through the pressing operation, this is done due to thermal mass and efficiency of heating. However, other examples contemplate adjusting the temperature of one or more of the platens during different stages of the pressing operation.

The line 924 demonstrates a multi-phased pressured application during the pressing operation. For example, a pressure experienced by an article at the beginning of the operation is at a level represented by number 932. At the time represented by the line 930, the pressure is reduced to a level represented by a number 934. This second pressure may be accomplished through a movement of one or more platens. The movement may not be measurable, but a position change of an actuator causes a position change as measured by a change in pressure experienced by the article. The pressure may be reduced to a third pressure 936 at a future time in the pressing operation. Any number of pressure variations may occur over a pressing operation. In an example for an article of footwear, the pressure is changed 1-3 times during a pressing operation. The change in pressure, as previously described herein and as shown in the lines 926 and 928, allows for an accelerated temperature increase with higher pressures. This accelerated temperature increase can reduce a pressing time. For example, variable pressures allows the press time for an article to reduce from 45 second down to 30 seconds. As the material increase in temperature they may become more susceptible deformation and bleeding; therefore, as the material temperature increase, a reduction in pressure reduces the potential for bleeding and/or unintended deformation.

Looking at the line 926 representing the temperature of the bottom material and the line 928 representing the temperature of the top material, a difference in temperature acceleration is depicted. This difference is in part a result of the proximity of each material to platens having different temperatures. For example, the bottom material is closer to the bottom platen and the top material is closer to the top platen. The bottom plate, in this example, is hotter than the top platen. Therefore, the bottom material accelerates greater toward a target temperature than the top material. However, over time in this example, the top material and the bottom material converge on a uniform temperature represented by the number 940. This temperature may be maintained for at least 10 seconds, in an example, to ensure sufficient state change of a bonding material occur, to ensure sufficient bonding occurs, and/or to ensure a uniform temperature is achieved. It is contemplated that the bottom material and the top material may not converge on a common temperature in an example. It is contemplated that the top material and the bottom material may follow a similar temperature line throughout the pressing operation in another example.

Figure 10:
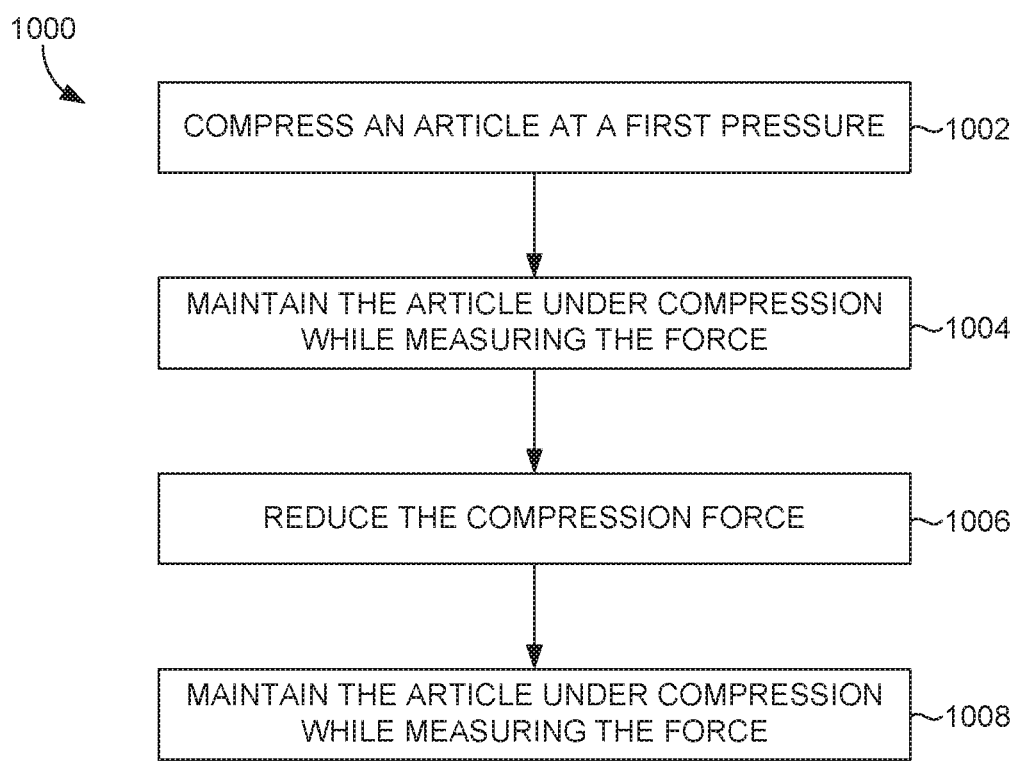
FIG. 10 depicts a method of pressing an article, in accordance with aspects hereof.

FIG. 10 depicts a method as a diagram 1000 for pressing an article, in accordance with aspects hereof. The method includes a block 1002 representing a compression of an article at a first force or pressure. The term force is used in an example as the amount of force applied by the actuator to the top platen may be measured as a force by the load cell as opposed to as a pressure. However, the top platen has a set size in an example and therefore the pressure resulting from the force is able to be calculated. Therefore, for purposes of the present application, the term force when describing amount of compression applied is synonymous with an amount of pressure.

During this compression of the article between a top platen and a bottom platen in the block 1002, the top platen and or the bottom platen may have a temperature that is above ambient conditions. However, in examples the platen or platens are not heated. In an example where both platens are heated relative to ambient conditions, the material contacting surface of each platen may have a temperature differential relative to the other platen. The temperature differential may be a result of different thermal characteristics of the platens, such as a thermal insulation or thermal conduction different between the contacting materials of each platen. In a specific example, the top plate includes a silicon foam material as a contacting material that is less thermally conductive of heat generated by the top platen as compared to a contacting material associated with the bottom platen. It is also contemplated that the top platen may generate less thermal energy than the top platen (e.g., set to achieve a lower elevated temperature from ambient as compared to the top platen). Combinations of the characteristics of the contacting material and the setting of the thermal energy generation may be used to achieve a temperature differential between the top platen material contacting surface and the bottom platen material contacting surface. The temperature differential between the two surfaces may be 1-20 degrees C., 5-15 degrees C., and/or 8-12 degrees C., in examples.

At a block 1004 the method of FIG. 10 provides for maintaining the article in compression at the force established at the block 1002 for a first period of time. This compression force is measured during the first period of time continuously, in an example, by a load cell. The force is maintained by adjusting a position of the actuator and as a result one or more platens to ensure the force is consistently applied during the first period. An example as to why the force may change during the first period of time is because of a state change of one or more material of the article under compression. A bonding material that is intended to have a state change (e.g., deform, melt, viscosity change) under pressure and/or heat may undergo that state change during the first time period. As the material changes state, the thickness of the article may diminish as the bonding material is deformed and absorbed, transferred, or integrated into the other materials of the article. This deformation redistributes the volume of material previously consumed by the bonding material such that a thickness of the article may change. As the thickness changes between the top platen and the bottom platen during the first time, a distance between the top platen and the bottom platen may need to be adjusted to maintain a consistent force.

The force that is maintained for the first period of time may be expressed as a pressure for a specific top platen and a bottom platen. The force therefore may be in a range of 6-10 psi for a given platen size, such as a 32 inch by 19 inch platen. The force may also be in a range of 4-15 psi as measured between the top platen and the bottom platen with a non-compressible (e.g., nickel plated steel that may for plates of the platens) surface. The force may also be in a range of 3,000 pounds to 9,000 pounds as measured at the load cell from the actuator, in an example. The force is maintained within the prescribed force by a range of plus/minus 0.025 psi through a continuous or frequent automated monitoring of the force/pressure and then adjustment by the actuator to maintain the prescribed pressure.

At a block 1006 the force applied to the platens producing the compressive force is reduced after the first time period. The first time period may be any length of time, such as 5 second, 10 seconds, 15 seconds, 20 second, 30 seconds, or anything therebetween. As previously discussed, the first timer period at the first force allows for an accelerated heating of the article to bring the article closer to an activation temperature for one or more bonding materials. The reduction in compression after this first time period limits bleeding of the bonding material from the article edges (e.g., prevents the bonding material from extending beyond a perimeter of an overlay onto an underlying material, such as a base material). Additionally, the reduction in pressure can reduce or prevent a deformation of a material forming the article, such as a cosmetic material forming an exposed surface of the article.

At a block 1008, the second force is maintained for a second period of time. This second period of time may be any length of time, such as 5 second, 10 seconds, 15 seconds, 20 second, 30 seconds, or anything therebetween. The second force is less than the first force. The second force may be 10%, 15%, 20%, 25%, 30%, 40%, 45%, 50%, 55%, 60%, 70%, 75%, or anything therebetween reduction in force from the first compressive force. The system continuously or frequently measures the force applied during the second time period and adjusts the actuator to maintain the force in an automated manner during the second period.

While the method of FIG. 10 only provide two distinct time periods at two different pressures, it is contemplated that any number of phases (e.g., time periods and pressures) may be implemented in connection with aspects hereof. As more layers are combined to form the article to be pressed, the more phases may be implemented. For example, if there are two material layers with one bonding layer therebetween, 1-2 phases may be leveraged. If there are three layers with a different bonding layer between each, 2-3 phases may be leveraged. If there are four layer or more, some aspects contemplated 3 phases may be leveraged. Additional variables include a thickness of each material, a composition of each material, a bonding material composition, a deformation or critical temperature for each of the materials to be bonded, and any combination thereof are all contemplated.

LISTING OF PARTS

100-System
102-Hot press
104-Cold press
106-Controller
108-Coupling
110-Frame
112-Base
114-Bottom member
116-Bottom consolidating plate
118-Supports
120-Bottom plate
121-Bottom hot platen
122-Bottom heating plate
124-Bottom contacting material
126-Actuator
128-Piston
130-Top consolidating plate
131-Top hot platen
132-Load cell
134-Top plate
136-Top heating plate
138-Top contacting material
140-Conveyor
142-Conveyor first end
144-Conveyor second end
146-Conveyor actuator
150-Top cold platen
152-Bottom cold platen
154-Top plate
156-Top contacting material
158-Bottom plate
160-Bottom contacting material
202-First track
204-Second track
206-Conveyor width
208-Platen width
210-Platen length
212-Platen length
300-Frame assembly
302-Frame
304-Foundational material
305-Upper
306-Base material
308-First overlay
310-Second overlay
312-Third overlay
314-Frame member
316-Frame member
318-Frame member
320-Frame member
322-Frame width
324-Frame length
326-Frame internal width
328-Adhesive
330-Adhesive
602-First conveyor position
604-Second conveyor position
900-Parameter graph
902-Pressure axis
904-Time axis
906-Temperature axis
908-High pressure
910-Low pressure
912-Earlier in time
914-Later in time
916-Low temperature
918-High temperature
920-Bottom platen temperature line
922-Top platen temperature line
924-Pressure line
926-Bottom material temperature line
928-Top material temperature line
930-Transition time line
932-First pressure
934-Second pressure
936-Third pressure
938-Starting temperature
940-Ending temperature Definitions Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The terms "comprises," "comprising," "including," and "having," are inclusive and therefore specify the presence of features, steps, operations, elements, and/or components, but do not preclude the presence or addition of one or more other features, steps, operations, elements, components, and/or groups thereof.

As used in the specification and the appended claims, the singular forms "a," "an" and "the" include plural referents unless the context clearly dictates otherwise. Thus, for example, reference to "a foam particle," "a midsole," or "an adhesive," including, but not limited to, two or more such foam particles, midsoles, or adhesives, and the like.

As used herein, the term "and/or" includes any and all combinations of one or more of the associated listed items.

As used herein, in substance or substantially means at least 80 percent, 85 percent, 90 percent, 95 percent, or more, as determined based on weight, volume, or unit.

The terms first, second, third, etc. can be used herein to describe various elements, components, regions, layers and/or sections. These elements, components, regions, layers and/or sections should not be limited by these terms. These terms can be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As used herein, the modifiers "upper," "lower," "top," "bottom," "upward," "downward," "vertical," "horizontal," "longitudinal," "transverse," "front," "back" etc., unless otherwise defined or made clear from the disclosure, are relative terms meant to place the various structures or orientations of the structures of the article of footwear in the context of an article of footwear worn by a user standing on a flat, horizontal surface.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

The terms "at least one" and "one or more of" an element are used interchangeably, and have the same meaning that includes a single element and a plurality of the elements, and can also be represented by the suffix "(s)" at the end of the element. For example, "at least one polyimide", "one or more polyamides", and "polyamide(s)" can be used interchangeably and have the same meaning.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z' Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

The terms "about" and "substantially" are used herein with respect to measurable values and ranges due to expected variations known to those skilled in the art (e.g., limitations and variabilities in measurements).

As used herein, the terms "optional" or "optionally" means that the subsequently described component, event or circumstance can or cannot occur, and that the description includes instances where said component, event or circumstance occurs and instances where it does not.

Unless otherwise specified, temperatures referred to herein are based on atmospheric pressure (i.e. one atmosphere).

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this invention is one well-adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

The following clauses are examples contemplated herein.

1. A method of pressing an article, the method comprising: compressing an article between a top platen having a top platen contacting surface and a bottom platen having a bottom platen contacting surface, the article compressed at a first force, wherein a temperature of the top platen contacting surface is less than a temperature of the bottom platen contacting surface; maintaining the article in compression at the first force between the top platen and the bottom platen for a first time period, wherein the first pressure is measured a plurality of times during the first time period and at least one of the top platen or the bottom platen are positionally adjusted to maintain the first force; reducing the compression of the article between the top platen and the bottom platen to a second force after the first time period;

and maintaining the article in compression at the second force between the top platen and the bottom platen for a second time period, wherein the second force is measured during the second time period and at least one of the top platen or the bottom platen are positionally adjusted to maintain the second pressure.

2. The method of clause 1, wherein the article is comprised of a first layer, an adhesive layer, and a second layer, wherein the adhesive layer is positioned between the first layer and the second layer.

3. The method of clause 2, wherein the adhesive layer bonds with the first layer and the second layer in response to achieving a temperature above at least 37 degrees C.

4. The method of any of clauses 2-3, wherein the adhesive layer achieves a temperature in a range of 115 degrees C. to 135 degrees C. for at least 10 seconds during the first time period.

5. The method of any of clauses 2-4, wherein the temperature of the top platen contacting surface and the temperature of the bottom platen contacting surface are above a temperature at which the adhesive layer bonds with the first layer.

6. The method of any of the clauses 1-5, wherein the article comprises a first layer, a first adhesive layer, a second layer, a second adhesive layer, and a third layer, wherein the first adhesive layer and the second adhesive layer are on opposite sides of the second layer.

7. The method of any of the clauses 1-6, wherein the top platen contacting surface is formed from a silicon-based composition.

8. The method of clause 7, wherein the silicon-based composition has a durometer in a Shore 'A' hardness of 0 to 40.

9. The method of clause 7, wherein the silicon-based composition has a durometer in a Shore 'A' hardness of 10 to 20.

10. The method of clause 7, wherein the silicon-based composition has an uncompressed thickness of 2 mm to 8 mm.

11. The method of clause 7, wherein the silicon-based composition has a compressed thickness during the first time period that is 30% to 70% an uncompressed thickness of the silicon-based composition.

12. The method of any of the clauses 1-11, wherein the first time period is determined by a portion of the article achieving a target temperature.

13. The method of any of the clauses 1-12, wherein the first force as experienced at the article is between 6 psi and 10 psi.

14. The method of any of the clauses 1-13, wherein the top platen contacting surface is 5 degrees C. to 15 degrees C. less than the temperature of the bottom platen contacting surface.

15. The method of any of the clauses 1-14, wherein the bottom platen contacting surface is maintained below a deformation temperature of the article in contact with the bottom platen contacting surface.

16. The method of any of the clauses 1-15, wherein the first force is maintained during the first time period within a range of plus or minus 0.025 PSI of the first force.

17. The method of any of the clauses 1-16, wherein the positional adjustment to maintain the first pressure is accomplished by an actuator adjusting a position of the top platen based on a measured pressure.

18. The method of any of the clauses 1-17, wherein a temperature of the top platen and the bottom platen are maintained within a range of plus or minus 0.025 degrees C. during the first time period and the second time period.

19. The method of any of the clauses 1-18, further comprising conveying the article to a second press subsequent to the second time period, wherein the second press is comprised of a second top platen, a second bottom platen, a second actuator, a second load cell, and a second controller having a processor and memory, the second controller effective to adjust an amount of force applied by the second actuator through the second top platen based on a measured force by the second load cell, the second top platen is a temperature at least 80 degrees C. less than the temperature of the top platen contacting surface during the first time period.

20. A hot press comprising: a frame; a top platen positionally adjustable to the frame by an actuator, wherein the top platen has a top platen contacting surface formed from a first material; a top platen heating element, the top platen heating element associated with the top platen; a load cell, the load cell coupled with at least one of the actuator, the top platen, or the frame, wherein the load cell is effective to measure a force applied by the actuator through the top platen; a bottom platen maintained by the frame, wherein the bottom platen has a bottom platen contacting surface formed from a second material; and a controller having a processor and memory, the controller effective to adjust an amount of force applied by the actuator through the top platen based on the load cell.

The invention claimed is:

1. A method of pressing an article, the method comprising:
    compressing an article between a top platen having a top platen contacting surface and a bottom platen having a bottom platen contacting surface, the article compressed at a first pressure, wherein a temperature of the top platen contacting surface is less than a temperature of the bottom platen contacting surface, wherein the top platen contacting surface is formed from a silicon-based composition that has an uncompressed thickness from 2 mm to 8 mm;
    maintaining the article in compression at the first pressure between the top platen and the bottom platen for a first time period, wherein the first pressure is determined a plurality of times during the first time period and at least one of the top platen or the bottom platen are positionally adjusted to maintain the first pressure in response to the plurality of determinations of the first pressure, wherein the silicon-based composition has a compressed thickness during the first time period that is 30% to 70% an uncompressed thickness of the silicon-based composition;
    reducing the compression of the article between the top platen and the bottom platen to a second pressure after the first time period;
    maintaining the article in compression at the second pressure between the top platen and the bottom platen for a second time period, wherein the second pressure is measured during the second time period and at least one of the top platen or the bottom platen are positionally adjusted to maintain the second pressure during the second time period;
    transferring the article to a cold press; and
    compressing the article at the cold press.

2. The method of claim 1, wherein the article is comprised of a first layer, an adhesive layer, and a second layer, wherein the adhesive layer is positioned between the first layer and the second layer.

3. The method of claim 2, wherein the adhesive layer bonds with the first layer and the second layer in response to achieving a temperature above at least 37 degrees Celsius.

4. The method of claim 2, wherein the adhesive layer achieves a temperature from 115 degrees Celsius to 135 degrees Celsius for at least 10 seconds during the first time period.

5. The method of claim 2, wherein the temperature of the top platen contacting surface and the temperature of the bottom platen contacting surface are above a temperature at which the adhesive layer bonds with the first layer.

6. The method of claim 1, wherein the article comprises a first layer, a first adhesive layer, a second layer, a second adhesive layer, and a third layer, wherein the first adhesive layer and the second adhesive layer are on opposite sides of the second layer.

7. The method of claim 1, wherein the silicon-based composition has a durometer in a Shore 'A' hardness of 0 to 40.

8. The method of claim 1, wherein the silicon-based composition has a durometer in a Shore 'A' hardness of 10 to 20.

9. The method of claim 1, wherein the first time period is determined by a portion of the article achieving a target temperature.

10. The method of claim 1, wherein the first pressure as experienced at the article is between 6 pounds per square inch (psi) and 10 psi.

11. The method claim 1, wherein the top platen contacting surface is 5 degrees Celsius to 15 degrees Celsius less than the temperature of the bottom platen contacting surface.

12. The method of claim 1, wherein the bottom platen contacting surface is maintained below a deformation temperature of the article in contact with the bottom platen contacting surface.

13. The method of claim 1, wherein the first pressure is maintained during the first time period within a range of plus or minus 0.025 PSI of the first pressure.

14. The method of claim 1, wherein the positional adjustment to maintain the first pressure is accomplished by an actuator adjusting a position of the top platen based on a measured pressure.

15. The method of claim 1, wherein a temperature of the top platen and the bottom platen are maintained within a range of plus or minus 0.025 degrees Celsius during the first time period and/or the second time period.

16. The method of claim 1, further comprising conveying the article to a second press subsequent to the second time period, wherein the second press is comprised of a second top platen, a second bottom platen, a second actuator, a second load cell, and a second controller having a processor and memory, the second controller effective to adjust an amount of pressure applied by the second actuator through the second top platen based on a measured force by the second load cell, the second top platen is a temperature at least 80 degrees Celsius less than the temperature of the top platen contacting surface during the first time period.

\* \* \* \* \*